United States Patent [19]

Wüstenberg et al.

[11] Patent Number: 5,680,796
[45] Date of Patent: Oct. 28, 1997

[54] MANUAL CONTROLLER WITH CONTROL LEVER

[75] Inventors: Dieter Wüstenberg, Kaiserslautern; Raymond Mohrbach, Luxemburg; Wolfgang Bredow, Birkenfeld; Thomas Burchard, Pforzheim; Rolf Fazler, Sternenfels; Thomas Haug, Kieselbronn; Fabian Elsässer, Straubenhardt, all of Germany

[73] Assignee: NBB Nachrichtentechnik GmbH & Co. KG, Olbronn-Durrn, Germany

[21] Appl. No.: 495,499

[22] PCT Filed: Feb. 17, 1994

[86] PCT No.: PCT/DE94/00195

§ 371 Date: Nov. 15, 1995

§ 102(e) Date: Nov. 15, 1995

[87] PCT Pub. No.: WO94/19735

PCT Pub. Date: Sep. 1, 1994

[30] Foreign Application Priority Data

Feb. 20, 1993 [DE] Germany .................. 43 05 282.7
Mar. 3, 1993 [DE] Germany .................. 43 06 577.5

[51] Int. Cl.$^6$ .................. G06F 3/033; G05G 9/047
[52] U.S. Cl. .................. 74/471 XY; 74/473 R; 74/475
[58] Field of Search .................. 74/470, 473 R, 74/475, 473 P, 471 XY

[56] References Cited

U.S. PATENT DOCUMENTS

| 4,470,320 | 9/1984 | Kim . |
| 4,558,609 | 12/1985 | Kim .................. 74/471 XY |
| 4,784,008 | 11/1988 | Paquereau et al. .................. 74/471 XY |
| 5,043,709 | 8/1991 | Kim . |
| 5,068,498 | 11/1991 | Engel . |
| 5,176,041 | 1/1993 | Meier et al. .................. 74/471 XY |
| 5,410,931 | 5/1995 | Peccev .................. 74/471 XY |

FOREIGN PATENT DOCUMENTS

| 2505064 | 11/1982 | France . |
| 2559305 | 8/1985 | France . |
| 654375 | 12/1937 | Germany . |
| 895869 | 11/1953 | Germany . |
| 1217481 | 5/1966 | Germany . |
| 1350073 | 4/1974 | United Kingdom . |

OTHER PUBLICATIONS

Int'l Search Report, dated Jun. 27, 1994, Appl. No. PCT/DE94/00195.

*Primary Examiner*—Charles A. Marmor
*Assistant Examiner*—David M. Fenstermacher
*Attorney, Agent, or Firm*—Loeb & Loeb LLP

[57] ABSTRACT

A manual controller including a control lever having a lower end; a housing having a bottom; a bearing held in the housing and supporting the control lever for pivotable deflection in two orthogonal axes around a fixed point from a zero position to a maximum pivot angle relative to the zero position while the lower end of the control lever moves over a path lying in a spherical surface having a radius R; and converter devices which translate pivotal movement of the control lever from its zero position into an electrical signal. The bearing is an elastomer joint having a transition part extending between a rim and an inner part for imposing on the control lever an elastic restoring force from all deflection positions toward the zero position of the control lever while simultaneously maintaining the spatial position of the fixed point. The bottom of the housing has a preshaped part for guiding the lower end of the control lever, the preshaped part having the shape of a segment of a sphere which has a radius corresponding to the radius R, and the lower end of the control lever is movable along the surface of said preshaped part during deflection movement of the control lever.

9 Claims, 5 Drawing Sheets

MANUAL CONTROLLER WITH CONTROL LEVER

TECHNICAL FIELD OF THE INVENTION

The invention relates to a manual controller comprising: a control lever having a lower end; a housing having a bottom; a bearing held in said housing and supporting said control lever for pivotable deflection in two orthogonal axes around a fixed point from a zero position to a maximum pivot angle relative to the zero position while said lower end of said control lever moves over a path lying in a spherical surface having a radius R; and converter devices which translate pivotal movement of said control lever from its zero position into an electrical signal.

Such manual controllers are a control device known from many fields of use; they should be best known for operating computers (in this case called "joystick"), however, they are also employed for controlling and steering, in particular for the remote control of real devices, for example, cranes, hoists, etc.

The manual control has a control lever as the sole actuating element, which is movable in two independent directions and whose movement in each direction (x or y) acts on a transmission element. Therefore two transmission elements are components of converters which convert the deflection of the control lever into an electrical signal; in this connection the manual controller can be used as an on/off switch as well as a proportional control element, wherein the electrical output signals in both main directions are proportional to the respective deflection of the control lever in the associated main direction.

To achieve such pivoting of the control lever, it is necessary that it be pivotably seated and held in a housing; on the one hand, sufficient deflection (deflection angle) must be assured, and on the other hand as precise as possible a definition of a zero position, i.e. a point in space wherein the converter devices do not deliver an electrical signal.

Such bearings are known in many structural variations; as a rule, either a universal joint or a ball joint or a movable mounting is used, or a combination of these components, one of which is then respectively associated to a main direction (x or y) in respect to its pivoting.

Such pivot bearings can be produced with great precision, but require considerable outlay in regard to precise production and assembly, so that pivot bearings constitute a considerable cost factor in connection with manual controllers.

In addition, such pivot bearings require a relatively large amount of space and thereby increase the space requirements and the weight of the entire manual controller, again with the result of increased material costs.

STATE OF THE ART

An example of the elaborate design of the pivot bearing in a manual controller is shown in DE 32 36 481 A1; the pivot point 17 is defined by means of a universal joint suspension 13. An elastic disk 40 is seated at a distance from the point of rotation 17 so it can be slidingly moved horizontally and, when it is laterally displaced by a deflection of the control lever 11, is used as a contact element for laterally disposed working contacts 45.

The employment of elastic auxiliary elements in connection with a joint is also known from automotive technology: DE 25 30 802 A1 discloses an annular disk 10 for the gear shift of a motor vehicle, whose restoring force is directed opposite to the downward motion of the gear shift lever 3 in the direction toward the bearing 6 disposed above, in which a spherical thickening of the gear shift lever 3 is held. Here, too, the point of rotation of the entire device is located outside the elastic annular disk 10.

Finally, in the same technical field U.S. Pat. No. 1,874,557 also discloses a gear shift lever whose joint consists of a bow-shaped guide element 12 which penetrates through the shaft 3 of the gear shift lever and determines and defines the pivot movement. For fixing the guide element 12 in place, a cylindrical rubber seal 7 is pressed between the shaft 3 and the gear housing 1, which permits pivoting of the shaft 3 through a small angle range.

OBJECT OF THE INVENTION

It is an object of the invention to embody the pivot bearing of a manual controller in a constructively simple and space-saving manner, so that considerable cost savings in manufacture and assembly can be realized.

Further than that, considerable freedom from maintenance and operational reliability should be assured.

In accordance with the invention this object is attained in that, in a controller as described at the beginning of this specification,

- the bearing comprises an elastomer joint having a rim via which said bearing is held in said housing, an inner part in the form of a cuff which encloses said control lever and fixes said control lever in place, and a transition part extending between said rim and said inner part for imposing on said control lever an elastic restoring force from all deflection positions toward the zero position of the control lever while simultaneously maintaining the spatial position of the fixed point (X),
- the bottom of said housing comprises a preshaped part for guiding said lower end of said control lever, said preshaped part having a surface which cooperates with said lower end of said control lever and which has the shape of a segment of a sphere which has a radius corresponding to the radius (R), and said lower end of said control lever being movable along said surface of said preshaped part during deflection movement of said control lever,
- the transition part of said elastomer joint has opposed surfaces which extend between said rim and said inner part and each surface of said transition part is provided with a respective one of two annular grooves and a cuff-shaped center area, and
- during deflection movement of said control lever away from the zero position, first portions of said transition part are placed in tension and second portions of said transition part are placed in compression such that when said control lever is at its maximum pivot angle, portions of said surfaces of said transition part which are in said first portions of said transition part assume an essentially linear form and portions of said grooves which are in said second portions of said transition part assume an increased depth.

It has been found that an elastomer joint as the single joint component, i.e. a joint element made of an elastic material, for example rubber or rubber-like plastics on the one hand, when having suitable dimensions, results in a precise seating in the above described sense, on the other hand, because of being of one piece saves several mechanical components in contrast to solutions up to now and furthermore at least partially generates a restoring effect which is desired in most manual controllers, so that it is possible either to completely omit separate restoring elements for returning the control lever to its vertical zero position or that they can be given correspondingly smaller dimensions.

Further than that, rubber or an appropriate plastic also has a sealing function, in particular in respect to the effect of moisture from the outside, against which the interior of the housing must be protected, because as a rule the electromechanical converter devices are located there, whose operational reliability would naturally be reduced by the penetration of moisture.

In connection with the already known solutions, separate covers, such as sealing cuffs, which again result in an increase in the structural volume and costs, are provided as a rule for those manual controllers which can also be used outdoors.

The elastomer joint in accordance with the invention in the form of a simple-to-produce one-piece component therefore replaces a number of components for storage, restoration and sealing required up to now, or at least simplifies their structural design.

These properties are particularly useful in an advantageous manner if the elastomer joint is embodied in accordance with the characteristics to be described below.

In connection with this it should basically be noted that, by means of a special design of the elastomer joint, its sealing and in particular resilient properties can be predetermined, for example, a defined restoring characteristic of the control lever can be achieved at least approximately by means of a suitable shaping of the elastomer joint. Many variations are conceivable in connection with this, for example different restoring characteristics in the two orthogonal main directions by means of an asymmetrical design of the flexible disk. For example, it is easily comprehensible that a "tight" reaction or else a "soft" restoring characteristic can take place by means of an appropriate cross-sectional variation from the longitudinal axis of the control lever to the housing, in which the elastomer disk is circumferentially seated.

In accordance with further advantageous embodiments of the invention there is also the option of assisting the restoring effect of the elastomer joint by an additional restoring element or to achieve the desired "characteristic restoration line" by the inclusion of such an additional restoring element in cooperation with the elastomer joint.

An advantageous embodiment of such an additional restoring element is described below.

The preferred solution has the advantage that it is located above the elastomer element and therefore does not need any space in the housing interior.

Further embodiments relate to the design of detent devices and of converter devices for translating the deflection of the control lever into electrical signals, which are here easily constructed small enough that they can also be employed without difficulties in a smaller size housing such as the invention makes possible.

BRIEF DESCRIPTION OF THE DRAWINGS

An exemplary embodiment of the manual controller in accordance with the invention will now be described in detail by means of the drawings which, for explaining the function, only contain the components of the manual controller which are essential to the invention, in particular known device elements, such as handle and converter elements, are not illustrated. It is basically possible here to use a multitude of devices known per se with the manual controller in accordance with the invention, too, so that it is also possible here to omit a detailed description of these components.

Shown are in.

DESCRIPTION OF THE EXEMPLARY EMBODIMENT

The essential components of the manual controller (FIG. 1) are a housing 10 with a preformed part 10A as the bottom, a control lever 20 projecting into this housing 10, a joint 30, which is used as the bearing element of the control lever 20 in the housing 10, and a separate restoring element 40 which assists the restoring action of the elastomer joint 30 in a controlled manner.

Figure 2:
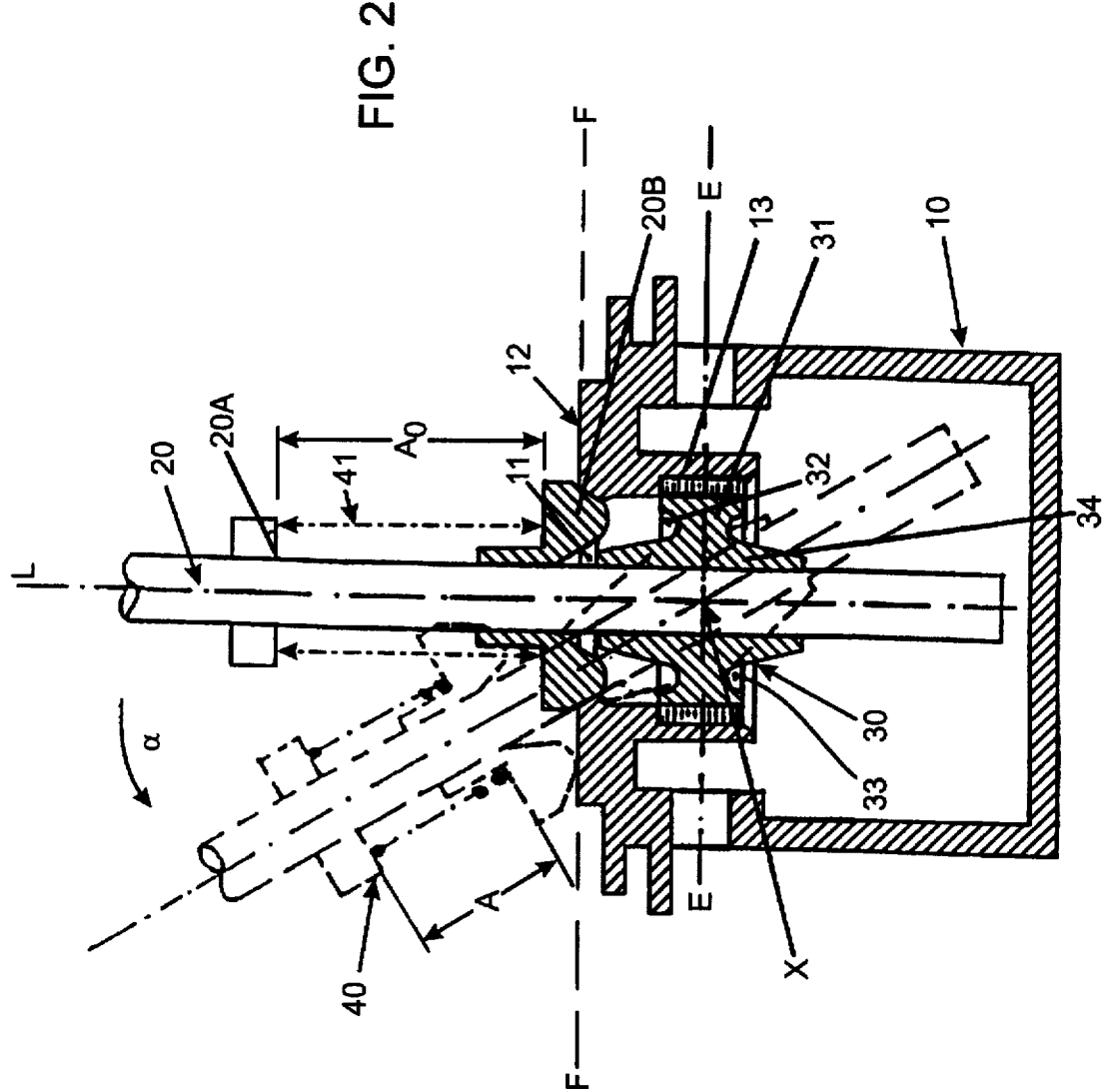
FIG. 2, a further section to represent an elastomer joint 30 in accordance with the invention.

In the cross-sectional representation of FIG. 2 the zero position of the control lever in its vertical position at a deflection angle α=0 is shown in solid lines, and the position pivoted by the angle α>0 in a deflection position of the control lever 20 in dashed lines.

The housing 10, embodied cup-like in a known manner, has a round opening on its top 12, which is followed in a downward direction toward the interior of the housing by a cylindrical extension 13. An annular groove or recess is located on the interior wall of this cylindrical extension 13, in which an elastomer disk 31, embodied dynamically balanced around the longitudinal axis L of the control lever 20, incidentally also embodied symmetrically with respect to its center plane E—E, and constituting the joint, is located. This elastomer disk 31 encloses the control lever 20 in its center area and continues in the shape of a cuff toward its top and bottom, so that a secure enclosure and fixation in place of the control lever 20 in a position, once it has been set, is assured. This solution has the advantage that the desired restoration effect is increased, since at least a part of the restoring forces or torque act on lever 20 at a distance from the point of rotation X.

Two annular grooves 32, 33 of approximately semicircular cross section are located on the outside immediately adjoining the cuff-like center area 34 of disk 31 on the top and underside of the elastomer disk. This association between the cuff on the one hand and the annular grooves on the other increases the effective deformation area of the elastomer joint and relieves the cuff of too great deformations. The decrease of the material cross section made possible by the annular grooves also makes pivoting the control lever easier, since they allow the formation of defined stretching areas as well as defined compression areas on the respectively oppositely located side of the elastomer disk. Thus the selection of the thickness of the material and the cross section of the elastomer disk can be adjusted over a wide range to the desired restoring characteristic while simultaneously maintaining an as exact as possible fixation of the pivot point X. In the process it is of course necessary to strive for the optimization of these two function parameters, since they can make opposite demands on the design of the elastomer disk.

Figure 3:
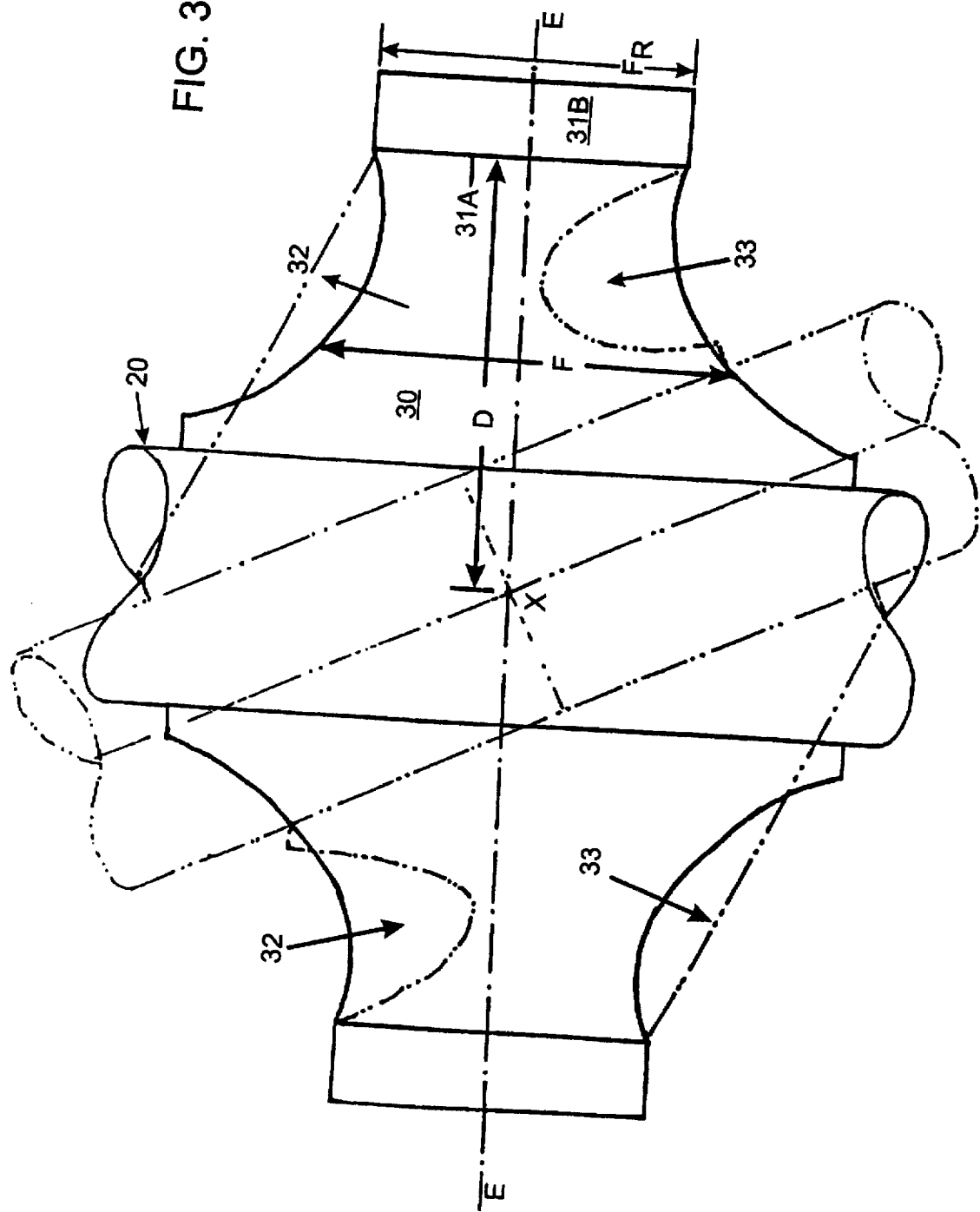
FIG. 3, a sectional representation of a preferred embodiment of the elastomer joint 30, FIG. 4, a perspective total view of a part 10A constituting the detent device, FIG. 5, a schematic functional representation of the preformed part 10A (section A—A of FIG. 4) in cooperation with the control lever, FIG. 6, a top view of the preformed part 10A in FIG. 4 with dimension examples, FIG. 7, a cross section through the preformed part 10A in the vertical plane A—A or B—B of FIG. 6 and FIG. 8, a sectional view, to an enlarged scale, of the detail X in FIG. 7.
Figure 4:
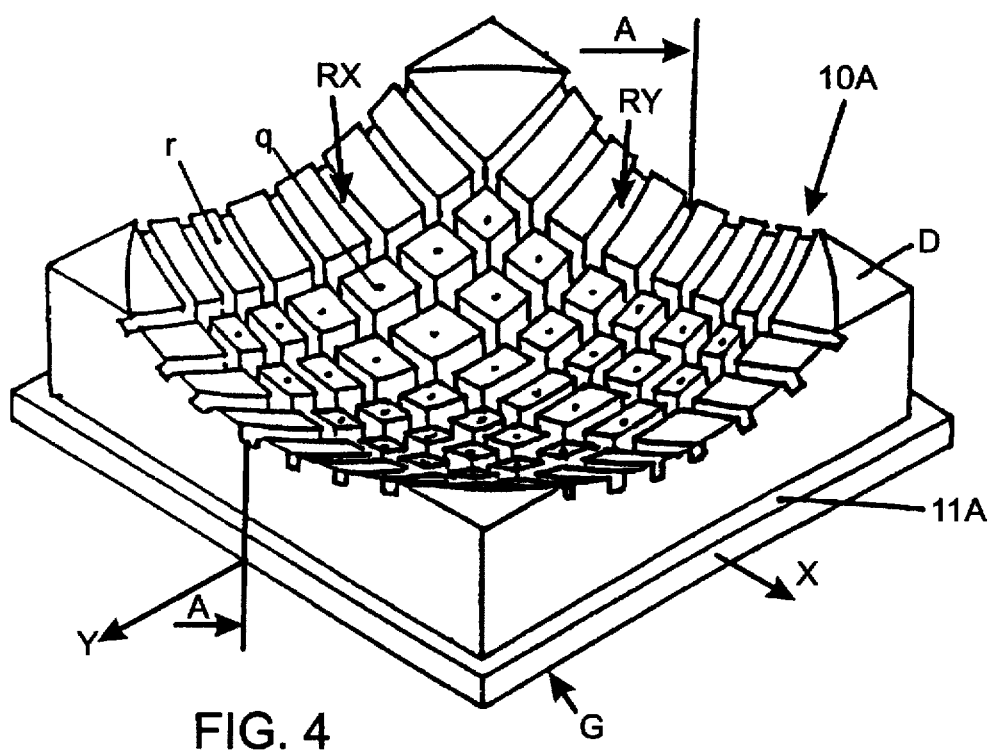
Figure 5:
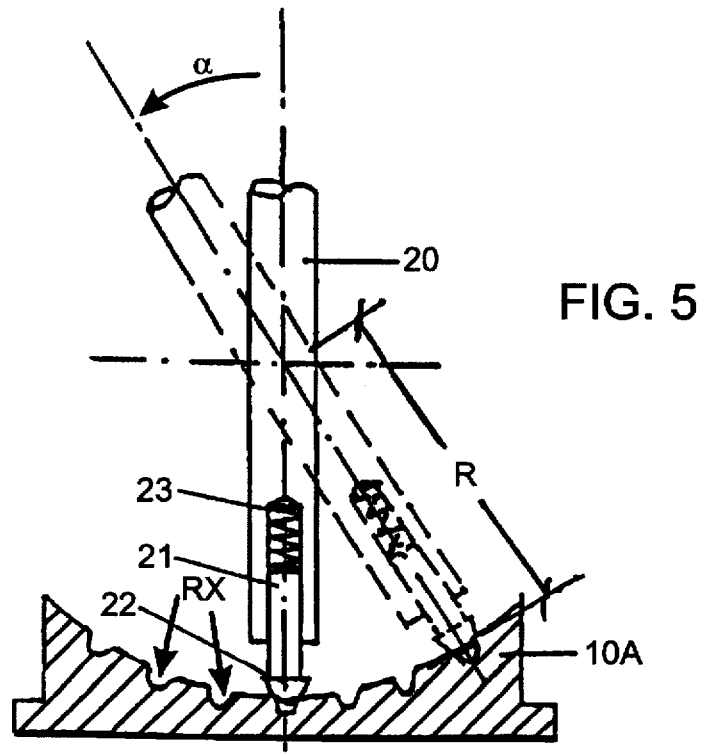
Figure 7:
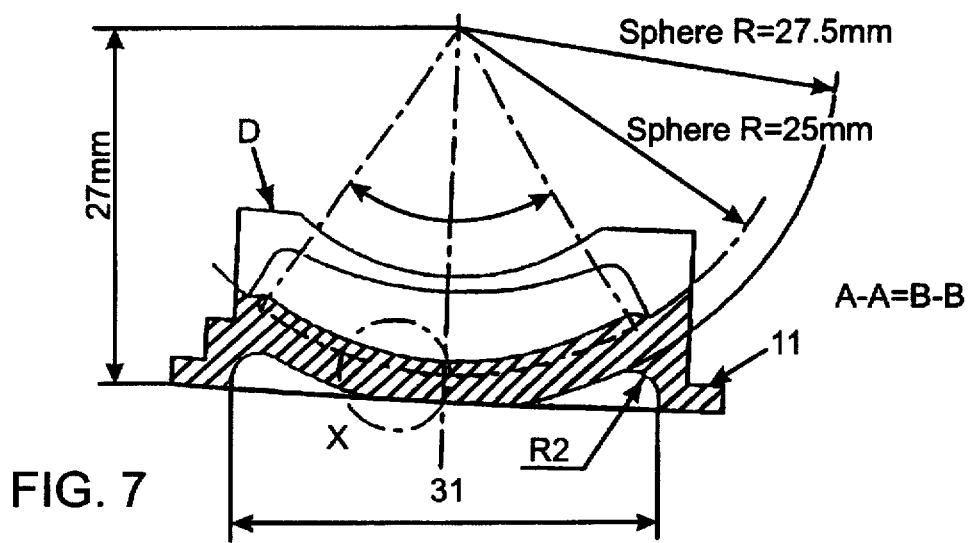

FIG. 3 shows a preferred embodiment of a rubber-elastomer disk. The annular grooves 32, 33 are embodied mirror-reversed in respect to the center plane E—E. The ring-shaped exterior 31A has been vulcanized onto a metal ring 31B, which is used as bearing ring in the cylindrical extension 13 of the housing 10.

The annular grooves 32, 33 are embodied relatively flat, their exterior wall is connected with the metal ring 31B and they make a transition into a cuff-like area in the direction toward the shaft 20.

The thickness F of the elastomer disk has its minimum $F_{MIN}$ at approximately ⅔ of its diameter D, in relation to the thickness $F_R$ at the edge of the elastomer disk the "depth" of the annular grooves 32, 33 is approximately 10% of the thickness $F_R$ at the edge.

When the shaft 20 is deflected by 30° to 40°, this dimensioning results in a deformation of the elastomer disk 31 as schematically indicated by dashed lines: the area stressed by traction extends almost linearly, the area stressed by pressure is compressed, wherein in the first case the annular groove is practically cancelled, while in the latter case the annular groove defines the start and course of the compression process and is deepened. It is important that the surface forces being generated in this case (forces tangentially to the surface of the elastomer disk) are distributed as homogeneously as possible in order to avoid extreme local stresses of the surface in the course of the deflection of the shaft 20, which could reduce the useful life of the joint.

This condition can be met by means of the embodiment of the elastomer disk illustrated in FIG. 3.

Depending on the area of use it is furthermore possible to achieve sufficiently precise seating as well as a defined deflection ability with reproducible restoring forces as well as sealing of the housing interior with the elastomer disk as a single component.

Figure 8:
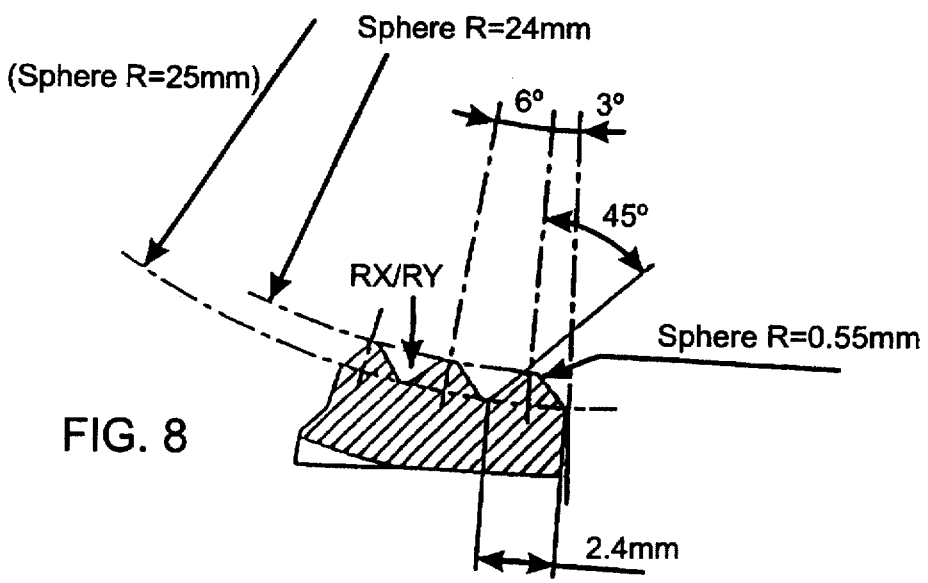
Figure 1:
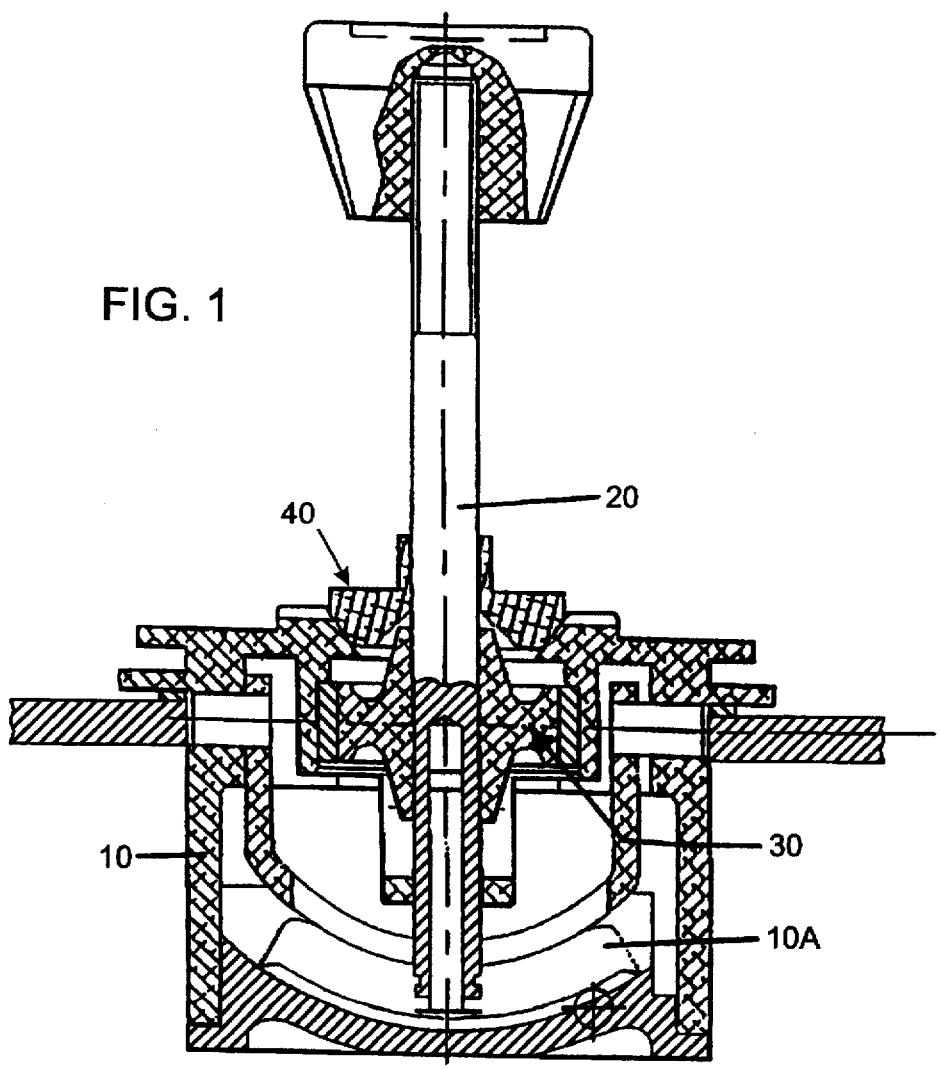
FIG. 1, a schematic section through a manual controller.

In the exemplary embodiment illustrated in FIGS. 1 and 2 it is assumed that a particularly strong restoration is to be achieved, for which the separate restoring element 40 is provided which aids the restoring effect of the elastomer joint.

This restoring element essentially contains an annular shoulder 20A fixedly attached on the upper part of the control lever 20 (for example by the underside of a corresponding ring), a displaceable adjustment member 20B seated on the top of the housing 10 and a helical spring 41 maintained between the annular shoulder 20A and the adjustment member 20B, which is supported on these two components. The adjustment member 20B is designed in such a way that in the zero position of the control lever 20, it is seated with conically extending exterior flanks on the corresponding inner edge of the opening 11 of the housing 10, by means of which a defined detent and centering effect of the control lever 20 in its zero position is achieved which cannot be provided with such acuteness by the elastomer joint alone. In this zero position the annular shoulder 20A and the top of the adjustment member 11 are at a distance $A_0$ from each other corresponding to the linear extension of the spring 41.

In the course of a deflection of the control lever over the pivot angle α, the adjustment member 20B is pushed out of its seat on the top 12 of the housing 10 and with an increasing deflection angle α the distance between the annular shoulder 20A and the adjustment member 22 is therefore reduced to a value $A<A_0$ with the result that with increasing deflection the spring 41 continues to be compressed and in this way a restoring force is generated which is proportional to the deflection angle α. In this case it is first assumed that the plane F—F of the top of the housing 10 extends parallel with the center plane E—E of the elastomer disk; however, it also easily conceivable that a specifically desired restoring characteristic can be achieved by means of forming or shaping of the surface 12 by an appropriate "response" of the adjustment member 22.

There is sufficient space available inside the housing and underneath the elastomer joint 30 for housing detent devices for dividing the pivot movement of the control lever into detent steps, as well as converter elements, known per se, for example hoops having an elongated hole through which the control lever extends and displaceable in the two main directions x and y, wherein they are seated on the inner wall of the housing in such a way that there they generate proportional electrical signals in accordance with their position, for example. In this case several variants of such devices are conceivable for which there is sufficient space even in a small and compact housing 10 and which do not unnecessarily increase the total weight of the manual controller.

A preferred exemplary embodiment of such a detent device is illustrated in the cross-sectional representation of FIG. 1 and FIGS. 4 to 8 and will be described in detail below:

When employing the manual controller it is often desirable to achieve a detent effect when deflecting the control lever, for example similar to a potentiometer provided as a regulator, wherein a defined number of preset detent positions provides the user with additional information regarding the respective control position of the control element. With manual controllers in particular which are used for the remote control of cranes or the like, for example, such additional information which is transmitted via a feeling in the hand is of particular importance, since as a rule the view of the user must remain on the remote-controlled device for safety reasons and thus visual displays on the manual controller, for example, would divert the attention of the user.

Numerous detent devices are known in many structural variations wherein as a rule an interchanging effect with the lower end of the control lever exists in such a way that the tip of the control lever encounters different resistances during its deflection movement, which is then passed on to the user by corresponding control information.

Separate components are mostly provided for the detent devices, which are more or less elaborately constructed and must be fitted separately into the housing of the manual controller, in which case there is a considerable amount of adjusting work to be performed; as a whole such detent devices also represent a cost factor in connection with manual controllers which should be as low as possible.

The basic concept of the illustrated embodiment consists in that only a single preformed part 10A is provided and that the detent positions and the desired stepped deflection characteristics are simply achieved in that the surface of the preshaped part 10A which is in the form of a section of a sphere is covered net-like with detent grooves.

In this case the exterior cross section is practically adapted to the interior cross section of the housing of the manual controller so that in accordance with an advantageous embodiment such a one-piece preshaped detent device part can constitute the bottom of the housing at the same time, in other words, no separate components at all are required for the detent device as such and instead with this embodiment the detent effect is achieved by a specific design of the bottom part of the housing of the manual controller.

If in addition the preshaped part has a circumferential rim on its lower edge, it is achieved that the shaped part is fixed in place in the direction of the longitudinal axis of the housing, since such a circumferential rim acts as a detent shoulder on which the wall of the housing is seated. With an exterior cross section of the preshaped part adapted to the interior cross section of the housing on the one hand and with the mentioned rim shoulder on the other, an exact positioning of the preshaped part in the manual controller is therefore achieved, no additional adjusting steps are necessary, the surface of the preshaped part provided with the detent grooves then is necessarily in exactly the position which has been predetermined and defined for the cooperation with the control lever.

The number of detent grooves in the two main directions (x and y) then corresponds to the preselected switching steps, wherein the shaping of the cross section of the detent grooves in cooperation with the design of the lower end of the control lever determines the "switching characteristics" in the sense of a more or less hard or soft step characteristic during the deflection of the control rod.

The preshaped part 10A essentially consists of a plate-shaped part, whose cross section is adapted to the interior cross section of the housing 30 of the manual controller in such a way that it constitutes the bottom of the housing 30, whose walls are then seated on a circumferential rim 11A. The upper surface, i. e. facing the interior chamber of the housing 30, of this preshaped part 10 is embodied to be in the form of a section of a sphere, wherein the radius of the associated sphere essentially corresponds to the radius of the surface of the sphere on which the end of the control lever 20 moves in the course of the deflection movement (radius R in FIG. 5).

Such a preshaped part 10A can be made of plastic, for example (for example injection molded), however, it can also be made of ceramic materials or metal.

The spherical-section-shaped surface is covered by a net or grid of detent grooves RX, RY, which extend in the two main directions x and y of the control lever 20. Square partial surfaces q are created in the central part of this surface by these detent grooves RX, RY, which are identified in FIG. 4 by a dot on their surface. This central square area is enclosed by a circumferential edge area in which the detent grooves RX, RY divide the surface into rectangular partial areas r, whose longitudinal axes point toward the center of the preshaped part 10A.

In the corners of the edge area, the spherical-section shape of the surface makes a transition into essentially triangular end surfaces D extending parallel with the base G of the preshaped part and which form, for example, the "remainder" of the originally flat surface of the preshaped part 10 prior to forming the spherical-section-shaped surface.

This preshaped part 10A constituting the bottom of the housing 30 is therefore a part of the detent device.

The other part of the detent device is located in the control lever 20 and consists of a slide 21, seated in the control lever 20 and spring-loaded, whose lower end 22 cooperates with the detent grooves RX, RY wherein because of the spring 23, in the area of each detent groove the slide enters into the groove more or less deeply, depending on its shape and the shape of the lower end 22 and in this way creates a more or less distinctive "detent feeling" in the course of operating the manual controller.

In the exemplary embodiment shown, the cross sections of the detent grooves are essentially V-shaped (FIG. 8), wherein the transition areas are rounded to avoid too harsh a detent characteristic.

Figure 6:
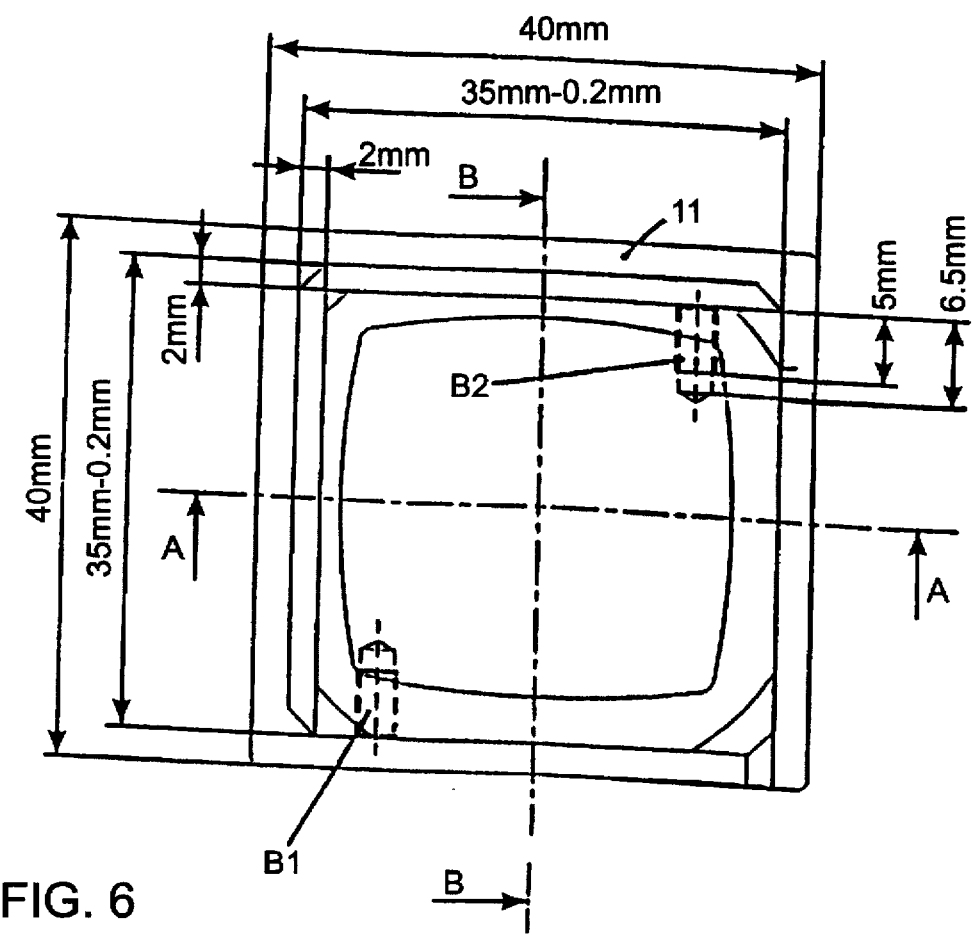

The preshaped part 10A can be inserted from below into the housing 30 without any difficulties and fixed in place there by means of two diagonally opposed bolt connections B1, B2 (FIG. 6).

We claim:

1. A manual controller comprising: a control lever (20) having a lower end; a housing (10) having a bottom; a bearing held in said housing and supporting said control lever (20) for pivotable deflection in two orthogonal axes around a fixed point (X) from a zero position to a maximum pivot angle relative to the zero position while said lower end of said control lever moves over a path lying on a spherical surface having a radius R; and converter devices which translate pivotal movement of said control lever from its zero position into an electrical signal; wherein said bearing comprises an elastomer joint (30) having a rim via which said bearing is held in said housing (10), an inner part in the form of a cuff which encloses said control lever (10) and fixes said control lever (10) in place, and a transition part extending between said rim and said inner part for imposing on said control lever (20) an elastic restoring force from all deflection positions toward the zero position of the control lever (20) while simultaneously maintaining the spatial position of the fixed point (X), said bottom of said housing comprises a preshaped part for guiding said lower end of said control lever (20), said preshaped part having a surface which cooperates with said lower end of said control lever (20) and which has the shape of a segment of a sphere which has a radius corresponding to the radius R, and said lower end of said control lever (20) being movable along said surface of said preshaped part during deflection movement of said control lever (20), said transition part of said elastomer joint (30) has opposed surfaces which extend between said rim and said inner part, and each surface of said transition part is provided with a respective one of two annular grooves (32, 33) and a cuff-shaped center area (34), and said grooves are formed such that, during deflection movement of said control lever (20) away from the zero position, first portions of said transition part are placed in tension and second portions of said transition part are placed in compression such that when said control lever (20) is at its maximum pivot angle, portions of said surfaces of said transition part which are in said first portions of said transition part assume an essentially linear form and portions of said grooves which are in said second portions of said transition part assume an increased depth.

2. A manual controller in accordance with claim 1, wherein said bearing further comprises a metal ring (31B) on said rim, said metal ring being held in said housing (10), and said elastomer joint (30) is vulcanized into said metal ring.

3. A manual controller in accordance with claim 1, wherein said inner part of said elastomer joint (30) is vulcanized onto said control lever (20).

4. A manual controller in accordance with claim 1, wherein said housing has a side wall and said preshaped part (10A) has a circumferential edge (11A) on which said wall of said housing (10) is seated.

5. A manual controller in accordance with claim 1, wherein said preshaped part (10A) consists of plastic, sintered ceramic or sintered metal material.

6. A manual controller in accordance with claim 1, wherein said preshaped part (10A) is provided with detent grooves (RX, RY) which cover said surface of said preshaped part in a grid-like manner, and said control lever is provided, at said lower end, with a spring-loaded slider (21) having a tip (22) which engages said detent grooves.

7. A manual controller in accordance with claim 6, wherein said slider comprises a spring for urging said tip toward said preshaped part, said tip (22) of said slider (21) and said detent grooves (RX, RY) are shaped, and the spring characteristic of said spring (23) are selected, in such a way that generated switching steps can be noticed when said tip engages in one of said grooves during operation without disturbing the function of said manual controller.

8. A manual controller in accordance with claim 7, wherein said detent grooves (RX, RY) have an essentially V-shaped or semicircular cross section and that said tip (22) of said slider (21) is essentially shaped as a section of a sphere.

9. A manual controller in accordance with claim 6, wherein the grid of the detent grooves (RX, RY) divides said surface of said preshaped part into square partial areas (q) in a central, square area of said surface of said preshaped part, and outside of this central area a circumferential edge area is defined, said detent grooves (RX, RY) divide said surface of said preshaped part into rectangular partial areas (r) whose longitudinal axes point to the center of curvature of said surface of said preshaped part (10A), said preshaped part has a flat base (G), and in the corners of the circumferential edge area the spherical-section shape of said surface of said preshaped part makes a transition into essentially triangular corner surfaces (D) which extend parallel with said base (G) of said preshaped part (10A).

* * * * *